(12) United States Patent
Tiirola et al.

(10) Patent No.: US 9,276,783 B2
(45) Date of Patent: Mar. 1, 2016

(54) UPLINK TRANSMISSION MODE SWITCHING IN SINGLE USER MULTIPLE-INPUT COMMUNICATION

(75) Inventors: Esa Tapani Tiirola, Kempele (FI); Kari Juhani Hooli, Oulu (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 401 days.

(21) Appl. No.: 13/500,104

(22) PCT Filed: Oct. 5, 2009

(86) PCT No.: PCT/EP2009/062883
§ 371 (c)(1),
(2), (4) Date: Jun. 8, 2012

(87) PCT Pub. No.: WO2011/042040
PCT Pub. Date: Apr. 14, 2011

(65) Prior Publication Data
US 2012/0250742 A1 Oct. 4, 2012

(51) Int. Cl.
*H04B 1/38* (2015.01)
*H04L 5/16* (2006.01)
*H04L 25/03* (2006.01)
*H04L 27/26* (2006.01)

(52) U.S. Cl.
CPC ....... *H04L 25/03343* (2013.01); *H04L 27/2613* (2013.01); *H04L 2025/03426* (2013.01); *H04L 2025/03802* (2013.01)

(58) Field of Classification Search
CPC ..................... H04L 25/03343; H04L 27/2613; H04L 2025/03802; H04L 2025/03426
USPC ............................................ 375/219; 455/73
See application file for complete search history.

(56) References Cited

U.S. PATENT DOCUMENTS

| 5,852,630 A * | 12/1998 | Langberg et al. ............. 375/219 |
| 2010/0002800 A1 * | 1/2010 | Kim et al. ..................... 375/295 |

OTHER PUBLICATIONS

Motorola, Multi-Antenna Support UL PUSCH/PUCCH/PRACH/SRS transmission, 3GP TSG RAN #57bis, Jun. 29-Jul. 3, 2009.*
LG Electronics, 3GPP TSG RAN WG1 Meetings #54bis, Sep. 29-Oct. 3, 2008.*
R1-082707, 3GPP TSG RAN WG1 53bis, Warsaw, Poland, Jun. 30-Jul. 4, 2008, "Uplink SU-MIMO for E-UTRA", Texas Instruments, 6 pgs.
R1-083652, 3GPP TSG RAN WG1 Meeting #54bis, Prague, Czech Republic, Sep. 29-Oct. 3, 2008, "Uplink MIMO Transmission for LTE-Advanced" LG Electronics, 6 pgs.
R1-083672, 3GPP TSG RAN WG1 Meeting #54bis, Prague, Czech Republic, Sep. 29-Oct. 3, 2008, "Considerations on the Uplink RS for LTE-A" Panasonic, 2 pgs.
R1-090787, 3GPP TSG RAN WG1 Meeting #56, Athens, Greece, Feb. 9-13, 2009, "Issues on DL-RS Design for LTE-A", LG Electronics, 5 pgs.
R1-091021, 3GPP TSG-RAN-WG1 Meeting #56, Athens, Greece, Feb. 9-13, 2009, Change Request, 36.213 CR 0208, rev. 2, V8.5.0, , "Correction to CQI/PMI/RI Reporting Field", Huawei, et al., 16 pgs.
R1-092644, 3GPP TSG RAN#57bis, Los Angeles, USA, Jun. 29-Jul. 3, 2009, "Multi-antenna Support in UL PUSCH/PUCCH/PRACH/SRS Transmission", Motorola, 5 pgs.
R1-093259, 3GPP TSG RAN WG1 Meeting #58, Shenzhen, China, Aug. 24-28, 2009, "Consideration on DM-RS Design for UL SO-MIMO in LTE-A", LG Electronics, 6 pgs.

* cited by examiner

*Primary Examiner* — Tanmay Shah
(74) *Attorney, Agent, or Firm* — Harrington & Smith

(57) ABSTRACT

There is provided switching of an uplink transmission mode. The switching includes manipulating an uplink transmission method and precoding of a demodulation reference signal. The switching may also include utilizing control signaling in indicating to a user terminal that the mode of uplink transmission is to be switched, for example.

26 Claims, 3 Drawing Sheets

UPLINK TRANSMISSION MODE SWITCHING IN SINGLE USER MULTIPLE-INPUT COMMUNICATION

FIELD

The invention relates generally to mobile communication networks. More particularly, the invention relates to uplink transmission in single user multiple-input communication.

BACKGROUND

As the number of mobile subscribers has been increasing constantly and most likely will continue to do so, a great number of users may be present in one geographically limited area (e.g. a cell of a communication network). This may cause issues with regard to capacity of the network. Thus, one of the targets of sophisticated radio communication networks, such as the Long Term Evolution (LTE) or the LTE-Advanced (LTE-A) of the $3^{rd}$ Generation Partnership Project (3GPP), is to be able to accommodate several subscribers in a cell without severe problems in the connections between a serving eNB and the subscribers (user terminal, UT).

For example the above mentioned communication networks are planned to adopt multiple-input multiple-output (MIMO) transmission between the UT and the eNB in order to improve the throughput of the network. The UT may have, for example, two transmit/receive antennas, which are typically separated by at least one half of a wave length or have a different polarization direction. The multiple antennas can be used to transmit the same data to enhance reliability of the communication (transmit spatial diversity), or they can transmit different data to enhance the throughput of the transmission (data multiplexing). When a single user is transmitting/receiving data to/from the eNB by using multiple antenna elements, the communication may be called single user MIMO (SU-MIMO).

To further enhance the reliability of the transmission and also to decrease the power consumption of the device, the UT may apply beamforming with the multiple antennas. That is, instead of transmitting the data omni-directionally, the UT directs its transmission/reception antenna beam towards a certain direction. In order to do this, the data transmitted from the antenna elements of the UT need to be weighted with certain coefficients. The beam may be formed independently for each data stream to be transmitted. However, selecting the coefficients so as to maximize the communication throughput requires knowledge of the channel state information.

For this reason, channel sounding signals, such as the sounding reference signals (SRS), are transmitted in uplink and the eNB may obtain knowledge of the radio interface condition by receiving the signals. The eNB may then inform the UT about the appropriate antenna coefficients. However, as the SRSs for sounding the channel between the UT and the eNB have only a limited capacity, the use of SRS may not be enough in connection with a great number of simultaneous subscribers. Thus, it is important to provide a solution for improving the sounding of the channel.

BRIEF DESCRIPTION OF THE INVENTION

Embodiments of the invention aim in improving the channel sounding in the uplink of MIMO transmission.

According to an aspect of the invention, there is provided a method as specified in claim 1.

According to an aspect of the invention, there are provided apparatuses as specified in claims 11, 23 and 24.

According to an aspect of the invention, there is provided a computer program product as specified in claim 25.

Embodiments of the invention are defined in the dependent claims.

LIST OF DRAWINGS

In the following, the invention will be described in greater detail with reference to the embodiments and the accompanying drawings, in which FIG. 1 presents an exemplary MIMO configuration;

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
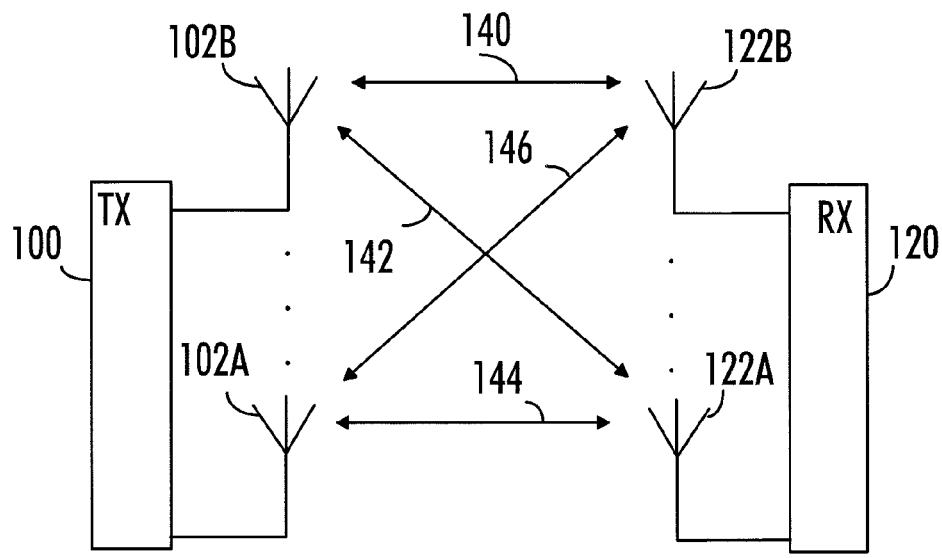

FIG. 1 illustrates an exemplary multiple-input multiple-output (MIMO) configuration in which both a transmitter (Tx) 100 and a receiver (Rx) 120 have two transmit/receive antenna elements 102A to 102B and 122A to 122B, respectively. Let us assume that the Tx 100 is a user terminal such as a palm computer, user equipment or any other apparatus capable of operating in a mobile communication network. The Rx 120 may be, for example, a base station or an evolved node B (eNB) as in LTE or in LTE-A. The Rx 120 may alternatively be a radio network controller (RNC) or any other apparatus capable of controlling a radio communication.

The elements 102A to 102B and 122A to 122B may be used for a diversity mode which enhances reliability of data transmission by transmitting and/or receiving the same data from both antennas, or they can be used for multiplexing purposes for transmitting different data from different antennas. It may also be that only the transmit antenna element 102B is transmitting data. In such a case, the receive antennas 122A and 122B may detect/receive a signal that has traveled to the Rx 120 via radio interface paths 142 and 140, respectively. Similarly, when the transmit antenna 102A is the only transmit antenna transmitting data, reception may take place with the receive antennas 122A and 122B via radio interface paths 144 and 146, respectively.

A process called precoding of data transmitted via multiple antennas may be applied at the Tx 100. Precoding is a type of beamforming to support single-layer or multi-layer transmission in MIMO radio systems. In precoding, the data transmitted from the Tx antennas 102A to 102B is weighted with appropriate coefficients such that the signal power is maximized at the receiver. Precoding may be single layer (rank 1) beamforming, when only one data stream is transmitted from the Tx 100. However, when the Rx 120 transmits multiple data streams, the single-layer beamforming cannot simultaneously maximize the signal level at all of the Rx 120 antennas 122A to 122B for all data streams and, hence, multi-layer (where a rank is larger than one) precoding is used in order to maximize the throughput performance in a multiple receive antenna system.

Single user MIMO (SU-MIMO) or single user multiple-input single-output (SU-MISO) denotes a case where a single user with a plurality of antennas is transmitting data to a receiver with one or more antennas, respectively. Precoding in such situations may apply random unitary precoding, where no downlink signaling is needed, or optimal unitary precoding including singular value decomposition with downlink feedback signaling, for example. A predefined codebook known both to the Tx 100 and the Rx 120 is often applied. The codebook comprises predetermined precoding coefficients.

The rank of the transmission denotes how many independent data streams are being transmitted. In the case of two Tx antennas, the Tx can transmit two different data streams. That is, regarding FIG. 1, the Tx 100 may be precoded to perform full rank transmission where antennas 102A to 102B transmit one data stream to the receiver 120 and another data stream to the same receiver 120. Thus, 2-layer (rank 2) transmission can be obtained with two transmit antennas. Similarly, with four transmit antennas, the transmitter can perform at maximum rank-4 (4-layer) transmission as full rank transmission. In general, the full rank of the channel depends on the minimum number of antennas among the Tx 100 and the Rx 120.

The Rx 120 (eNB) may transmit a rank indicator (RI) to the Tx 100 in order to let the Tx 100 know how many data streams it is appropriate to transmit. The decision of the RI may depend on various parameters including the channel condition, data load, etc.

As mentioned above, a precoding matrix codebook comprising the precoding coefficients may be applied in precoding so that the Rx 120 may simply inform the Tx 100 about the applied index of the precoding matrix codebook. In practice, the Rx 120 (eNB) may transmit a precoding matrix index (PMI) and the RI to the Tx 100 (UT) in downlink. The PMI and the RI are used to inform the Tx 100 which codebook index to apply in precoding of the data transmitted through the antennas 102A to 102B. An exemplary codebook is presented in FIG. 3. According to LTE-A, it has been decided that the codebook 300 for two Tx antennas comprises six entries for rank 1 and one entry for rank 2, seven entries 304 to 316 in total, each including predetermined precoding coefficients $C_{01}$, $C_{11}$, $C_{21}$, $C_{31}$, $C_{41}$, $C_{51}$, and $C_{62}$, wherein the first subscript denotes the precoding matrix index and the second subscript denotes the rank index, that is the number of layers to be used in the transmission (which is one or two with two transmit antennas). The PMI+RI can be signaled with three bits since seven entries can be indicated, at minimum, with three bits.

When the Tx 100 has four Tx antennas, the codebook index transmitted to the Tx 100 can be a 6-bit indication indicating the rank and index of the precoding coefficients to be used. With four Tx antennas, it has been decided that the codebook has 61 entries for precoding coefficients which can be indicated with six bits ($2^6$=64). As can be understood from the above, the Rx 120 may indicate the PMI and the RI simultaneously with three or six bit codebook index regarding whether the Tx has two or four antennas, respectively. In following, a codebook is understood to contain all entries that can be indicated with codebook index, that is, both the entries 304 to 316 used for indicating precoding coefficients as well unused entries 302. However, no PMI or RI is associated with the unused entries. In practice, the transmission of PMI+RI may take place via a physical downlink control channel (PDCCH).

The precoding may be applied to user data, which can be transmitted on a physical uplink shared channel (PUSCH) to the eNB (Rx) 120. The eNB 120 may grant a transmission time interval (TTI) to the UT 100, that is, an uplink scheduling grant to perform transmission in the uplink for a certain time period. The data on the PUSCH is allocated, at minimum, in one physical resource block (PRB) which has both a time and a frequency dimension. The PRB, according to the LTE-A, comprises twelve subcarriers in the frequency dimension and six or seven orthogonal frequency division multiplexing (OFDM) or single-carrier frequency division multiple access (SC-FDMA) symbols in the time dimension corresponding to 0.5 ms, depending whether a long or a short cyclic prefix is applied, respectively. Specifically, the uplink transmission in the LTE-A facilitates single carrier frequency division multiple access (SC-FDMA), in which data is transmitted in time domain to a single modulation symbol. The uplink transmission is scheduled by the eNB, so the eNB knows when to expect a specific UT to transmit data and at which frequency.

A drawback of the closed-loop precoding in which the Rx informs the Tx about the to-be-used precoding codebook index is that the Rx requires information about the channel state (CSI) in order to perform a sophisticated decision. For this reason, the so called sounding reference signals (SRS) are applied in the uplink transmission. To provide an antenna specific CSI, the SRSs are non-precoded and they are transmit antenna specific. That is, the eNB needs to receive a unique SRS from each Tx antenna in order to obtain information regarding the state of the radio channel between the UT and the eNB. Based on this information, the eNB may perform precoding matrix selection and transmit the PMI+RI to the UT.

The SRS sequences may be cyclically shifted in order to create a plurality of orthogonal reference signals sequences. The SRSs may further be bandwidth dependent and apply a sub-carrier offset (orthogonal transmission comp). Assuming that only single antenna UEs exist and is based on the available orthogonal SRS sequences, at maximum 160 UEs may be accommodated in one sub-frame SRS in one cell. According to the LTE-A, the sub-frame is a 1 ms long time period corresponding to one tenth of a whole UL frame. In practice, the number of UEs that can be accommodated with unique SRS sequences is significantly lower.

In addition to the channel sounding option of non-precoded SRS, the SRS may be used for other purposes as well comprising support for channel-aware packet scheduling, support for timing control and power control, and support for adaptive modulation/coding (AMC). However, in order to enable dynamic power control and AMC for each UL transmission grant, the SRS should be frequent enough in order to follow fast fading.

Another type of reference signal applied in the LTE-A uplink is a demodulation reference signal (DMRS). The DMRS is used, for example, in coherent detection and for demodulation purposes and it has the same bandwidth as the uplink user data transmission, whereas the SRS typically has a higher bandwidth. The DMRS can be transmitted in every slot on the PUSCH, whereas in a physical uplink control channel (PUCCH) there are two to three DMRSs in each PUCCH slot.

The DMRS may be precoded to maximize a SU-MIMO or SU-MISO cell edge performance. The precoding enhances the signal-to-noise ratio (SNR) and therefore precoded DMRS signals are better for UEs located on the cell edge. Precoding introduces a precoding gain which is present already at channel estimation. Further, the precoded DMRS is transmitted as a unique sequence only from each data stream, not from each Tx antenna, and thus there may be situations (when the rank of the transmission is less than the number of Tx antennas) wherein the eNB does not receive a unique DMRS from each antenna. The precoded DMRS is therefore not suitable for estimating the channel state information (CSI).

According to an embodiment, the DMRS may be used to enable channel sounding, AMC, power control, etc., as will be described next with reference to FIG. 2.

According to an embodiment, there is presented a method of temporarily switching a UL transmission mode in data communication. The method may comprise, referring to FIG. 2A, establishing a connection 204 between an eNB 200 and a UT 202. The communication configuration may be SU-MIMO or SU-MISO, that is the UT 202 is equipped with multiple antennas. The eNB 200 may have one or more antennas. The establishment of the connection 204 may be triggered by the UT 202 when it has data to transmit to the eNB 200. The UT 202 may for example request for an uplink scheduling grant. On the other hand, the eNB 200 may trigger the communication connection 204 between the UT 202 and the eNB 200. Alternatively, the connection 204 may be scheduled to take place at a predetermined point of time. The communication link 204 may be wireless over, for example, the evolved universal mobile telecommunications system terrestrial radio access network (E-UTRAN), which is the radio interface of the LTE.

Figure 2A:
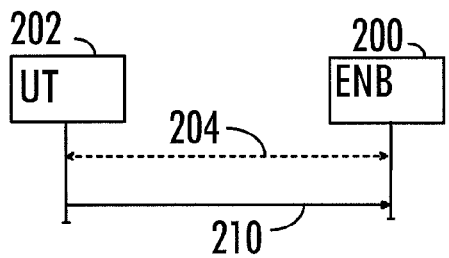
FIG. 2A shows a method of switching an uplink transmission mode according to an embodiment.

According to the embodiment of FIG. 2A, the eNB 200 and the UT 202 apply dynamic and temporal uplink transmission mode switching, wherein an uplink transmission method and the precoding of a demodulation reference signal (DMRS) in uplink transmission 210 are determined by the selected transmission mode for a predetermined period. In other words, the switching comprises manipulating the uplink transmission method and/or the precoding of a demodulation reference signal. The UL transmission method may denote the way in which the user data together with control data is transmitted from the UT 202 to the eNB 200. The method may comprise multiplexing, diversity, single antenna transmission, etc.

As explained above, according to an embodiment, the DMRS may be used to enable channel sounding, AMC, power control, etc. Accordingly the DMRS may be non-precoded. The different uplink transmission modes comprise at least one mode in which the DMRS is precoded and at least one mode in which the DMRS is non-precoded. The non-precoded DMRS may be applied, for example, in indicating to the eNB 200 the condition of the radio interface between the UT 202 and the eNB 200.

The non-precoded DMRS is transmitted from each UT antenna such that each antenna transmits its own unique sequence of DMRS signal. The reference signals, such as the DMRS, are basically zero correlation codes (ZAC) such as Zadoff-Chu or generalized Chirp-like polyphase sequences. The sequence of DMRS is generated by varying the cyclic (or circular) shift of the sequence, selecting the length of a sequence and selecting a sequence group. The sequence group may be selected based on a cell (cell specific parameter). However, the sequence length and the cyclic shift may be selected for each uplink allocation. The DMRS sequences transmitted from different antennas at each UT 202 may be separated by cyclic shifts and/or by orthogonal cover codes. The length of orthogonal cover codes is equal to the number of DMRSs in a subframe, and each of the DMRSs is multiplied with a corresponding coefficient of allocated orthogonal cover code. In addition, sequence hopping or sequence group hopping patterns may be used to enhance the reliability of the transmission. The hopping may occur after each slot in the uplink transmission when the uplink transmission 210 is allocated for a period longer than one slot.

According to an embodiment, the transmission mode is switched between at least two of the following modes: a first mode, in which the demodulation reference signal and user data are precoded, a second mode, in which the demodulation reference signal is non-precoded and the user data is precoded, a third mode, in which the user data is transmitted such that the transmission appears as single antenna transmission to the eNB and the demodulation reference signal is non-precoded, and a fourth mode, in which the user data is non-precoded and transmitted from at least two antenna elements by using a transmission diversity method such as space-time block coding, space-frequency block coding, frequency selection transmit diversity, cyclic delay diversity, etc., or any combination thereof, and both the user data and the demodulation reference signal are non-precoded. As mentioned above, the switching of the mode does not need to take place among all of the above-mentioned four modes, but among a subset of the four modes, for example, among two of the four modes. That is, the configuration may be such that the uplink transmission mode is switched between two modes in a "mode-pair".

According to an embodiment, the non-precoded DMRS is applied as an indication of the condition of the channel in the second and fourth mode. Further, the non-precoded DMRS may be applied for other purposes as well, including power control, adaptive modulation and coding, demodulation, etc.

The uplink transmission mode is temporarily switched, according to an embodiment, for a predetermined period. The predetermined period may be linked to different pre-determined time instances, depending on the configuration. The period may be limited to a single subframe, to a period of a scheduled uplink transmission configured with scheduling grant, or to a period of a single hybrid automatic repeat request (HARQ) process (i.e., potential re-transmissions under the same resource allocation grant may also use the same mode). In other words, temporal switching means that the indicated uplink transmission mode may be used only for a predetermined period. More specifically, in one embodiment, a mode may only be used for a period of one scheduled uplink transmission, wherein the period may be at least one subframe. In one embodiment, the uplink transmission mode is temporarily switched for a period of one subframe. This enables highly dynamic mode switching where higher layer signaling is not needed. Temporal mode switching also avoids the need for acknowledging the mode switch in the uplink or, alternatively, avoids the need for error case handling due to a missed mode switching command. Possible control information in the embodiment is transmitted on the physical layer. The switching means that the transmitting method and the precoding of the DMRS that have been applied during the uplink transmission corresponding to a previous grant may be changed in the uplink transmission corresponding to the current/previous grant.

The modes may be switched from the first mode to the second mode, or from the second mode to the first mode, or from the fourth mode to the second mode, for example. Pre-configuration as to which mode is to be switched on may be based on higher layer signaling or during standard specification. In other words, any possible switching between the modes is available, depending on what triggers the switching of the mode.

Figure 2B:
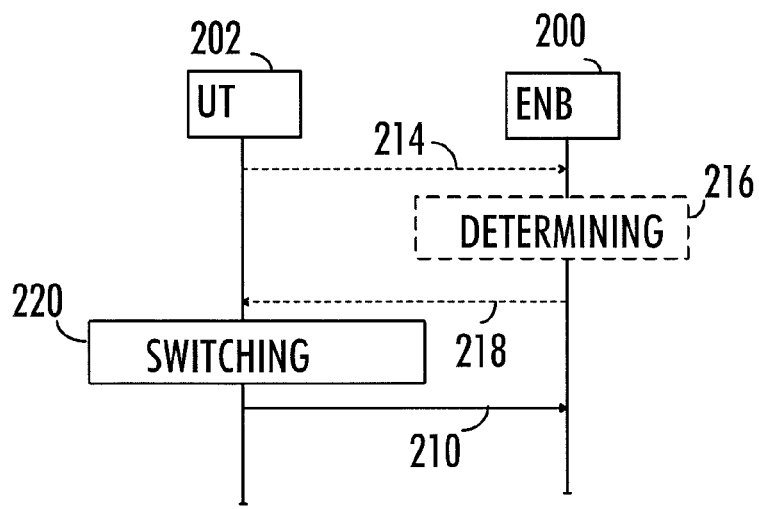
FIG. 2B shows a method of switching an uplink transmission mode according to an embodiment.

According to an embodiment, the method of switching the UL transmission mode utilizes at least one of the following: control information indicating that the uplink transmission mode is to be switched and prescheduled information indicating when the uplink transmission mode is to be switched. In the former option the eNB 200 transmits control information to the UT 202 indicating that a mode is to be switched. The information may comprise information that the mode is to be switched and the UT 200 may already know that which mode is to be switched on. In addition, the eNB 200 may include information to the transmitted control information about which mode is to be switched on. The transmission of the control information is depicted in FIG. 2B in which the eNB 200 determines in step 216 whether a mode should be switched and/or which mode should be switched on, and transmits control information 218 to the UT 202. Based on this information, the UT 202 switches the mode of the uplink transmission 210 in step 220.

In yet another embodiment, the eNB 200 transmits control information that contains the mode to be used in the uplink transmission 210 corresponding to the control information. That is, the control information 218 may inform the mode to be used. In other words, the control information 218 may not need to contain the actual order to switch, but the mode to be used serves as a trigger for the UT 202 to switch the uplink transmission mode.

Figure 3:
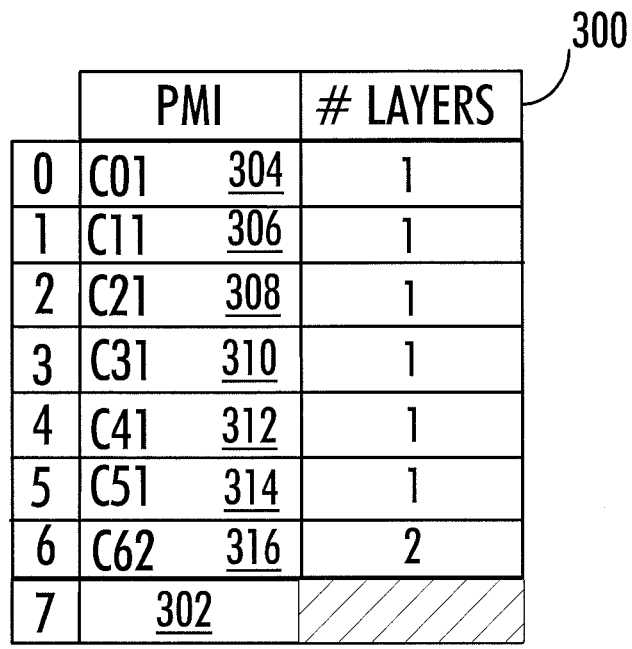
FIG. 3 shows an exemplary table of precoding codebook according to an embodiment.

According to an embodiment, the control information 218 about the selected mode and/or the indication that a mode is to be switched is indicated to the UT 202 by applying the codebook entries. As can be seen in FIG. 3, the codebook for two transmit antennas has seven entries 304 to 316, thus the codebook has one entry 302 that is not allocated for any precoding coefficients. The seven entries 304 to 316, in addition to pointing out the precoding coefficients, may also serve as indication for the UT to use a certain uplink transmission mode. The certain uplink transmission mode may be, for example, the first mode. The unused codebook entry 302 may then be used for indicating a switch of the uplink transmission mode or, alternatively, for indicating an uplink transmission mode other than the one indicated by the entries 304 to 316. The other mode corresponding to 302 may be configured by higher layer signaling or predetermined e.g. in specifications. More specifically, when the eNB 200 transmits a codebook index corresponding to the entry 302 to the UT 202, the UT 202 obtains knowledge that switching of the uplink transmission mode away from the mode indicated with the entries 304 to 316 is to be performed.

In other words, the eNB 200 may determine that the codebook index is to be transmitted to the UT 202 as the control information on the to-be-applied transmission mode, wherein the at least one entry 302 of the precoding codebook is reserved for indicating that an uplink transmission mode other than the uplink transmission mode indicated by the rest of the precoding codebook entries is to be applied for a predetermined period. The indication may comprise at least one of the following: a switch of a transmission mode and knowledge of which transmission mode is to be applied. For example, the entry 302 may be used for indicating that the second mode, the third mode, or the fourth mode is to be activated, when the rest of the precoding codebook entries indicate that the first mode is to be used.

In an embodiment, the entries 304 to 316 of the codebook inform the UT to apply a certain mode, for example the first mode, with certain coefficients C and to generate a certain amount of data streams. The entry 302, in turn, informs the UT to use a mode other than the one indicated with entries 304 to 316, for example the second mode, the third mode or the fourth mode.

In another embodiment, the entry 302 may indicate to switch to certain mode when the entry 302 is indicated the first time. When the entry 302 is indicated for the second time, the uplink transmission mode may not change. That is, the entry 302 may indicate the UE to apply certain mode each time the entry 302 is read. Alternatively, the second indication from the eNB to apply the entry 302 may trigger the UT to switch back to the uplink transmission mode used before the first indication of the entry 302, when the first and the second indication to the entry 302 are consecutive.

In an embodiment, the eNB 200 may determine that the codebook index is to be transmitted to the UT 202 as the control information on the to-be-applied transmission mode, wherein the at least one entry 302 of the precoding codebook not used for indicating precoding coefficients is reserved for indicating that an uplink transmission mode to be applied for a predetermined period. That is, an uplink transmission mode other than the uplink transmission mode associated with the codebook entries used for indicating also precoding coefficient matrices is to be applied for a predetermined period. For example, the entry 302 may be used for indicating that the second mode, the third mode, or the fourth mode is to be activated when the first mode is the transmission mode associated with the entries 304 to 316 in FIG. 3.

According to an embodiment, when the UT 202 has already received information via other means on which of the modes is to be activated if the entry 302 is indicated, the at least one entry 302 may comprise other type of information, for example, the duration of the switched mode.

In the case of a precoding codebook for four transmit antennas, there are three unused entries in the codebook. That is, three of the altogether 64 entries of the codebook are not reserved for indicating precoding coefficients and a rank of the transmission and are, thus, available for indicating the to-be applied uplink transmission mode. For example, the three entries may be used for indicating three different modes. Alternatively, one entry can indicate one mode and the other two entries may indicate alternative implementations of the same mode or, for example, multiple non-precoded DMRS configurations. To be more precise, one entry can indicate to transmit DMRS with an orthogonal cover code when using a certain mode, and another entry may indicate not to apply the orthogonal cover code in the same certain mode.

According to another embodiment, the control information 218 about the selected mode and/or the indication that a mode is to be switched is transmitted in the downlink signaling, for example in uplink resource allocation signaling. This requires that one or more bits of the uplink resource allocation signaling be reserved for this purpose.

In the latter option in which the prescheduled information indicating the uplink transmission mode switch is applied, the UT 202 and the eNB 200 may have been prescheduled to switch to a certain mode at a certain point of time. That is, the switching of the mode may take place periodically. In other words, the uplink transmission mode may alternate over time. Alternatively, the prescheduled information may comprise information indicating that when a certain event occurs, the mode is to be switched to a certain mode. The event may be for example a certain modulation coding scheme or a certain cyclic shift value, etc. In any case, no control information needs to be transferred between the eNB 200 and the UT 202 to indicate mode switching.

As explained with regard to FIG. 2B, the eNB 200 determines in step 216 whether a mode should be switched on. The determination may be based on indication of a channel condition among with other reasons such as load of the PUSCH or the SRS, SRS inter-cell interference, synchronization, UE velocity, time elapsed after a previous transmission mode switch, etc. Thus, according to an embodiment, the eNB 200 receives an indication 214 of the condition of the channel between the UT 202 and the eNB 200. The channel condition indication may also be based e.g. on the number of data retransmissions needed. The eNB 200 may thus determine in 216 that the uplink transmission mode is to be switched on the basis of the received indication 214 and determine that the control information 218 on the to-be-applied uplink transmission mode is to be transmitted to the UT 202. The reason for the dotted lines is that if the determination is based on reasons other than received information, the uplink indication 214 may not take place. Similarly, when the switching is pre-scheduled, the steps 214 to 218 may not take place.

According to an embodiment, the UT 202 receives the control information 218 indicating that the transmission mode is to be switched on. Further, the UT 202 switches in step 220 the uplink transmission mode dynamically according to the received control information.

Let us take a look at the four available uplink transmission modes in more detail. In the first mode, the UT 202 precodes user data on the PUSCH with the precoding matrix as specified in the PMI+RI that is transmitted to the UT 202 by the eNB 200. However, in full rank transmission the user data may be precoded with an identity matrix, which equals non-precoded user data transmission. The PUSCH may comprise both data and control signals. The control signals may be for example an acknowledgement (ACK), a non-acknowledgement (NACK) or a channel quality indicator (CQI), for example. Prior to the determination of the PMI+RI at the eNB 200, the eNB 200 may have obtained information about the channel condition based on SRS, for example. Further, the PMI+RI decision at the eNB 200 may be based on various other issues including the load on the PUSCH, interference, to mention only few. The DMRS is precoded with the same precoding matrix as the PUSCH. With regard to the codebook in FIG. 3, the eNB 200 may have transmitted the PMI+RI to the UT 202, wherein the PMI+RI indicates that the antenna weighting coefficients $C_{21}$ of the codebook are to be used in precoding of the PUSCH and DMRS. The coefficients of $C_{21}$ may be, for example, $$\frac{1}{\sqrt{2}}\begin{bmatrix}1\\1\end{bmatrix}$$

denoting that the data, same for both of the UT antennas, needs to be multiplied with $$\frac{1}{\sqrt{2}}$$

in order to maximize the SNR at the receiver (at the eNB 200). Naturally the eNB 200 could have selected some other weighting coefficients as well depending on the decision at the eNB 200. In this mode, a unique DMRS sequence is transmitted with each transmitted data stream, that is, not necessarily from each UT 202 antenna.

In the second mode, the PUSCH is precoded but the DMRS is not. In such a case, the non-precoded DMRS may be applied to inband channel sounding. That is, the eNB 200 takes care that up-to-date channel state information per transmit antenna is available from the UE 202. The eNB 200 may apply SRSs for the purpose of channel sounding. However, when the second mode is switched on, the DMRS serve for this purpose as well. In such a case, the DMRS is transmitted non-precoded from each UT 202 antenna. The transmission of the transmit antenna specific DMRS may occur in a fast Fourier transform (FFT) block or in an SC-FDMA symbol dedicated for DMRS transmission.

The third mode comprises transmitting the data on the PUSCH from the UT 202 such that it appears to be transmitted from a single antenna at the eNB 200. It means that the UT 202 applying SU-MIMO or SU-MISO transmission can be received as transmission from a single antenna user terminal. It can be seen as a fall-back mode for SU-MIMO or SU-MISO transmission. The implementation of the third mode may determine if the UT 202 actually uses only a single antenna or virtualizes multi-antenna transmission to appear as single antenna transmission to the eNB 200.

Thus, the third mode does not require as accurate and up-to-date information on the channel condition as the first and the second mode applying precoding at least on the PUSCH. Thus, it is a reliable mode to be used when the quality of channel condition information is e.g. temporarily decreased. The dynamic and temporal selection between the third mode and the other modes where the data on the PUSCH is precoded offers significant improvements in the flexibility of the radio communication.

The fourth mode applies transmit diversity transmission, in which the user data is transmitted from at least two antenna elements at the UT 202 and the demodulation reference signal is non-precoded. Thus, also here the DMRS is transmitted from each UT 202 antenna and the DMRSs received at the eNB 200 may be used in channel estimation, AMC, power control, etc. Also this mode is beneficial when the quality of channel condition information is e.g. temporarily decreased.

As explained earlier, the switching between the modes may take place as a prescheduled event or based on transmitted control information, such as the unused codebook index and the uplink resource allocation signaling. If the codebook index is used for indicating the mode switch, the UT 202 may not obtain any knowledge of which precoding matrix to use in the precoding of the PUSCH during the following uplink transmission period scheduled with grant. Thus, according to an embodiment, the precoding for the user data is performed on the basis of the most recently indicated precoding coefficients, or on the basis of a most recently indicated long-term entry of a precoding codebook. In other words, the most recently indicated precoding coefficients are obtained from the most recently received PMI+RI at the UT 202 (last received PMI+RI). Thus it means the precoding coefficients used at the most recent uplink transmission. On the other hand, if the eNB 200 has used means other than the codebook to indicate what coefficients are to be used in precoding, those coefficients may be applied in the data precoding.

In another embodiment, wherein the precoding corresponds to the most recently indicated long-term entry of a precoding codebook, a long term precoding may be applied in the precoding of the data. The long term precoding may be determined at the eNB 200 on the basis of spatial channel conditions. The effect of fast fading in long term PMI determination may be mitigated by averaging transmit antenna specific channel estimates available on the eNB 200 either over time or over frequency, or both. The long term precoding may use the same codebook as previously indicated precoding (which is determined by using both spatial and frequency and/or dependent channel conditions). The eNB 200 indicates the long term PMI separately to the UT 202. It may be indicated using higher layer signaling, or specific downlink physical layer signaling, or it may be contained in the uplink scheduling grant. In other words, both the eNB 200 and the UT 202 have knowledge of the long term PMI that may be used in case the PMI is not indicated to the UT.

The UT 202 may use the long term PMI for the first PUSCH transmission on allocated PRBs. After a period of PUSCH inactivity, the long term PMI may be estimated based on an SRS with a significantly longer period, or potentially from previous physical uplink control channel (PUCCH) transmission. The PUCCH may transmit reference signals, ACK/NACK and/or CQI as precoded, so the precoding of those types of data can be used as reference for the precoding of the data on the PUSCH.

As the precoding is PRB specific, the change of PRB allocation may change the precoding configuration. However, the PMI to be used may also be estimated by the eNB 200 from the previous inband channel sounding with a non-precoded DMRS, e.g. by using a PMI determination method used for determining long term precoding.

However, in another embodiment where the switching takes place in a prescheduled manner, the eNB 200 may apply the PMI+RI indication transmitted to the UT 202 in which the to-be-used precoding matrix for PUSCH data is indicated. In other words, when the mode switching alternates automatically over time, the PMI selection may be signaled to the UT 202 as usual.

According to an embodiment, when the NACK triggers a re-transmission in the uplink direction, the precoding for the re-transmitted data may be the same as it was in the first transmission. Alternatively, the UT 202 may receive signaling with the NACK that indicates another PMI to be used in the re-transmission, or alternatively, the UT 202 may use the PMI received while waiting for ACK/NACK signalling.

Figure 4:
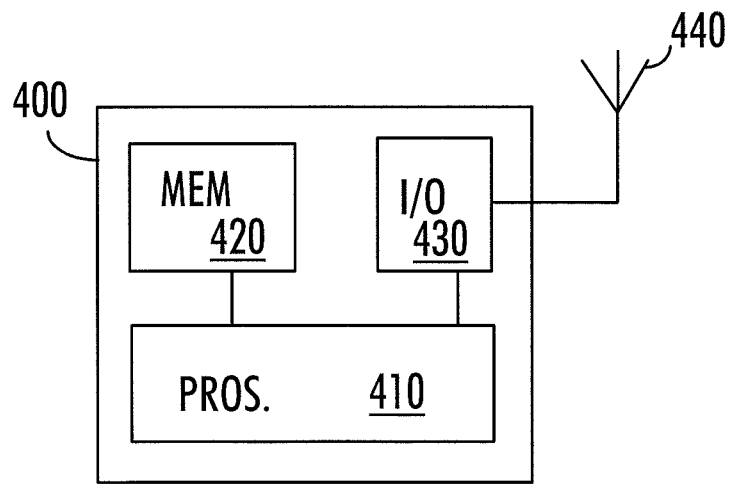
FIG. 4 illustrates an apparatus capable of switching the uplink transmission mode according to an embodiment.

According to an embodiment, the UT 202 allocates the non-precoded DMRSs to the uplink resources as in full rank transmission. In full rank transmission, the number of data streams, each carrying a unique orthogonal DMRS sequence, is equal to the number of Tx antennas. That is, the same number of sequences as needed for non-precoded DMRS transmission where the non-precoded DMRS is transmitted from each Tx antenna. An uplink transmission grant contains indication for at least one DMRS sequence, containing indication of at least cyclic shift. The other DMRS sequences can be defined by the DMRS indicator by applying an increment value either for an indicated cyclic shift or for an orthogonal cover code index, or for both, according to predetermined rules. The increment value may be configured by using higher layer signaling or it may be predetermined. Incrementation may be repeated until a sufficient number of DMRS sequences is obtained. A very general architecture of an apparatus according to an embodiment of the invention is shown in FIG. 4. FIG. 4 shows only the elements and functional entities required for understanding the embodiments of the invention. Other components have been omitted for reasons of simplicity. The implementation of the elements and functional entities may vary from that shown in FIG. 4. The connections shown in FIG. 4 are logical connections, and the actual physical connections may be different. The connections may further be direct or indirect and there can merely be a functional relationship between components. It is apparent to a person skilled in the art that an apparatus 400 may also comprise other functions and structures.

The apparatus 400 for performing mode switching according to an embodiment comprises a processor 410. The processor 410 may be implemented with a separate digital signal processor provided with suitable software embedded on a computer readable medium, or with a separate logic circuit, such as an application specific integrated circuit (ASIC). The processor 410 may comprise an interface such as a computer port for providing communication capabilities. The apparatus 400 may further comprise a memory 420 operatively connected to the processor 410. However, memory may also be integrated in the processor 410 and, thus, no memory 420 may be required.

The processor 410 may thus be configured to establish a connection between a network element and a user terminal. The processor 410 is further configured to apply dynamic and temporal uplink transmission mode switching, wherein the uplink transmission method and the precoding of the demodulation reference signal in the uplink transmission are determined by the selected transmission mode for a predetermined period, as described earlier.

According to an embodiment, the apparatus 400 is comprised in a network element of a mobile communication network. The network element may be a base station.

According to another embodiment, the apparatus 400 is comprised in a user terminal of a mobile communication network. The user terminal may be a mobile phone.

The apparatus 400 may further comprise an input/output interface 430. The I/O interface 430 may further be operatively connected to a plurality of antennas 440 enabling a connection to and from an air interface. The I/O interface 430 may be applied in establishing the connection via the one or more antennas. Further, the apparatus 400 may apply the I/O interface 430 in transmitting and/or receiving data via the radio interface.

According to an embodiment, the apparatus 400, applicable to a network element, may, for example, receive an indication of a condition of a channel between the user terminal and the network element, determine that the uplink transmission mode is to be switched on the basis of the received indication, and transmit control information of the to-be-applied uplink transmission mode to the user terminal. The control information may be, for example, the codebook index indicating an entry of the codebook, wherein the unused entries of the codebook are applied in mode switching.

According to an embodiment, the apparatus 400, applicable to a user terminal, may, for example, receive control information indicating which uplink transmission mode is to be applied for a predetermined period and switch the uplink transmission mode dynamically and temporarily according to the received control information.

The apparatus 400, applicable to a user terminal, may further perform precoding on the user data on the basis of the most recently indicated entry of a precoding codebook, or on the basis of a long-term PMI. Thus, the memory 420 may store the last received PMI, the last received long-term average PMI, etc.

According to an embodiment, an apparatus 400 for switching an uplink transmission mode in data communication may comprise at least one processor 410 and at least one memory 420 including a computer program code, wherein the at least one memory 420 and the computer program code are configured to, with the at least one processor 410, cause the apparatus 400 at least to apply dynamic and temporal uplink transmission mode switching, wherein an uplink transmission method and precoding of a DMRS in uplink transmission are determined by the selected transmission mode.

Figure 5:
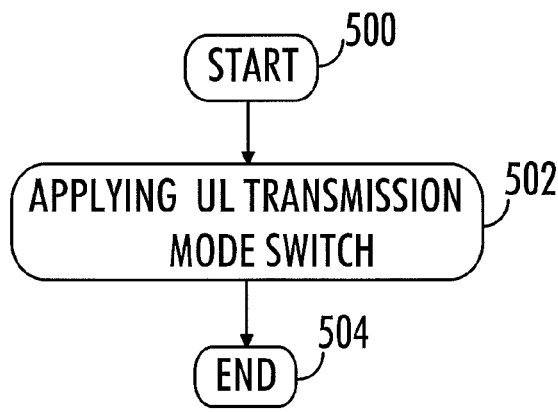
FIG. 5 illustrates a method of switching the uplink transmission mode according to an embodiment.

FIG. 5 illustrates a method of switching an uplink transmission mode according to an embodiment. The method starts in step 500. In step 502 applying dynamic and temporal uplink transmission mode switching, wherein an uplink transmission method and precoding of a demodulation reference signal in uplink transmission are determined by the selected transmission mode, takes place. The method ends in step 504.

Figure 6:
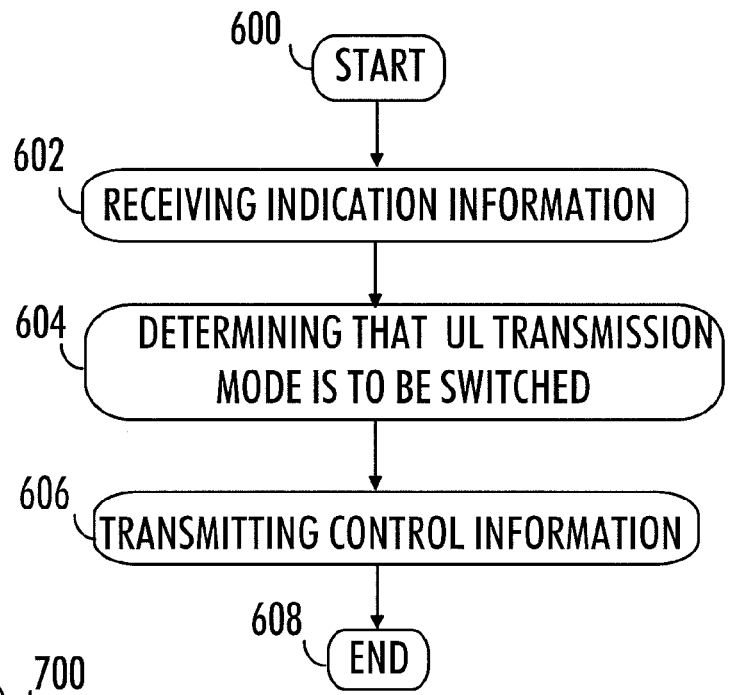
FIG. 6 illustrates a method performed at a network element for switching the uplink transmission mode according to an embodiment.

FIG. 6 illustrates a method performed at a network element for switching an uplink transmission mode according to an embodiment. The method starts in step 600. In step 602, the network element, such as an eNB, receives an indication of a condition of a channel between a user terminal and the network element. Step 604 comprises determining that the uplink transmission mode is to be switched on the basis of the received indication, and determining that control information on the to-be-applied uplink transmission mode is to be transmitted to the user terminal takes place in step 606. The method ends in step 608.

Figure 7:
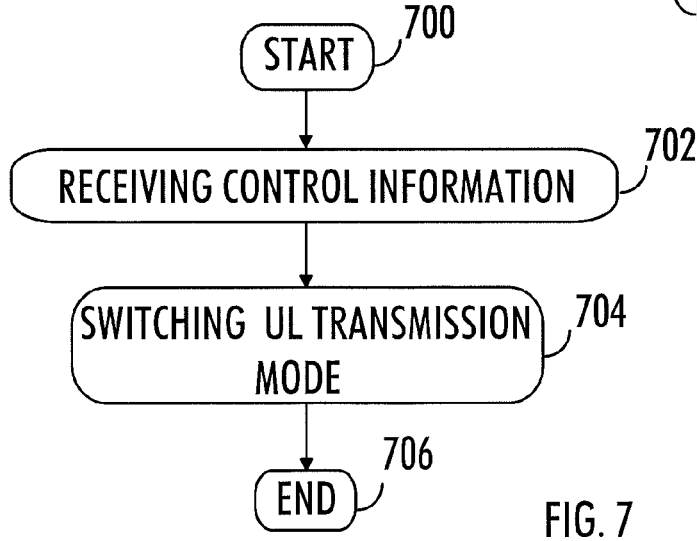
FIG. 7 illustrates a method performed at a user terminal for switching the uplink transmission mode according to an embodiment.

FIG. 7 illustrates a method performed at a user terminal for switching an uplink transmission mode according to an embodiment. The method starts in step 700. Step 702 of the method comprises receiving control information at the user terminal indicating an uplink transmission mode to be applied for a predetermined period. The received control information may indicate that an uplink transmission mode other than the uplink transmission mode indicated by the rest of the precoding codebook entries 304 to 316 of FIG. 3 is to be applied for a predetermined period, if the control information relates to one of the at least one codebook entry 302. In step 704, the uplink transmission mode is switched dynamically according to the received control information. The method ends in step 706.

The embodiments of the invention offer many advantages. A good cell-edge performance with the precoded DMRS can be maintained while enabling a possibility to use the non-precoded DMRS for the channel estimation (inband channel sounding). The use of non-precoded DMRS offers a better quality for the channel state information than that obtained by using only SRSs. The DMRS is present in two blocks per each one ms sub-frame. Further, the DMRS benefits from variable bandwidth allocation according to PUSCH allocation and the number of interfering UTs is small. The existing signaling field without major limitations may be used in the embodiments and the embodiments offer joint optimization of SRS overhead and precoded DMRS performance. Further, the non-precoded DMRSs serve in reducing the SRS load and interference.

The techniques and methods described herein may be implemented by various means. For example, these techniques may be implemented by hardware (one or more devices), firmware (one or more devices), software (one or more modules), or combinations thereof. For a hardware implementation, the apparatus of FIG. 4 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of the systems described herein may be rearranged and/or complimented by additional components in order to facilitate the achieving of the various aspects, etc., described with regard thereto, and they are not limited to the precise configurations set forth in the given figures, as will be appreciated by one skilled in the art.

Thus, according to an embodiment, the apparatus for performing the tasks of FIGS. 1 to 3 and 5 to 7 comprises processing means for establishing a connection between a network element and a user terminal and processing means for applying dynamic and temporal uplink transmission mode switching, wherein an uplink transmission method and precoding of a demodulation reference signal in uplink transmission are determined by the selected transmission mode.

Embodiments of the invention may be implemented as computer programs in the apparatus 400 according to the embodiments of the invention. The computer programs comprise instructions for executing a computer process for performing the uplink transmission mode switching. The computer program implemented in the apparatus 400 may carry out, but is not limited to, the tasks related to FIGS. 1 to 3 and 5 to 7.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method comprising:
    establishing a communication connection between a network element and a user terminal;
    applying, over the communication connection, dynamic uplink transmission mode switching between a first uplink transmission mode and a second uplink transmission mode, wherein the first uplink transmission mode comprises a precoded demodulation reference signal in uplink transmission, and the second uplink transmission mode comprises a non-precoded demodulation reference signal in uplink transmission;
    acquiring control information indicating the first uplink transmission mode or the second uplink transmission mode to be applied over the communication connection for a predetermined period, wherein the control information is determined by the network element; and
    switching between the first uplink transmission mode and the second uplink transmission mode dynamically over the communication connection according to the control information.

2. A method comprising:
establishing a communication connection between a network element and a user terminal; and
applying dynamic uplink transmission mode switching between different uplink transmission modes over the communication connection,
wherein said method is for switching an uplink transmission mode between at least two of the following modes over the communication connection:
a first mode, wherein the demodulation reference signal and user data are precoded;
a second mode, wherein the demodulation reference signal is non-precoded and the user data is precoded;
a third mode, wherein the user data is transmitted such that the transmission appears as single antenna transmission to a receiver and the demodulation reference signal is non-precoded; and
a fourth mode, wherein the user data is non-precoded and transmitted from at least two antenna elements with a transmission diversity method, and the demodulation reference signal is non-precoded.

3. The method of claim 1, wherein the first uplink transmission mode or the second uplink transmission mode is temporarily switched for a period of one subframe.

4. The method of claim 1, further comprising:
utilizing at least one of the following:
control information indicating that the first uplink transmission mode or the second uplink transmission mode is to be switched and prescheduled information indicating when the first uplink transmission mode or the second uplink transmission mode is to be switched.

5. The method of claim 1, further comprising:
receiving, at said network element, an indication of the condition of a channel between said user terminal and said network element;
determining that the uplink transmission mode is to be switched on the basis of the received indication; and
determining that control information on the to-be-applied uplink transmission mode is to be transmitted to said user terminal.

6. The method of claim 1, further comprising:
determining that a precoding codebook index is to be transmitted to the user terminal as control information on the to-be-applied transmission mode, wherein at least one entry of the precoding codebook not used for indicating precoding coefficients is reserved for indicating an uplink transmission mode to be applied for a predetermined period.

7. The method of claim 1, further comprising:
receiving a precoding codebook index as control information on the to-be-applied transmission mode, wherein at least one entry of the precoding codebook not used for indicating precoding coefficients is reserved for indicating an uplink transmission mode to be applied for a predetermined period.

8. The method of claim 2, further comprising:
precoding the user data on the basis of the most recently indicated precoding coefficients, or on the basis of a most recently indicated long-term entry of a precoding codebook.

9. The method of claim 2, further comprising:
applying the non-precoded demodulation reference signal to uplink resources as in full-rank transmission.

10. An apparatus comprising a processor configured to:
establish a communication connection between a network element and a user terminal;
apply, over the communication connection, dynamic uplink transmission mode switching between a first uplink transmission mode and a second uplink transmission mode, wherein the first uplink transmission mode comprises a precoded demodulation reference signal in uplink transmission, and the second uplink transmission mode comprises a non-precoded demodulation reference signal in uplink transmission;
acquire control information indicating the first uplink transmission mode or the second uplink transmission mode to be applied over the communication connection for a predetermined period, wherein the control information is determined by the network element; and
switch between the first uplink transmission mode and the second uplink transmission mode dynamically over the communication connection according to the control information.

11. An apparatus comprising a processor configured to:
establish a communication connection between a network element and a user terminal; and
apply dynamic uplink transmission mode switching between different uplink transmission modes over the communication connection,
wherein said apparatus is for switching an uplink transmission mode between at least two of the following modes over the communication connection:
a first mode, wherein the demodulation reference signal and user data are precoded;
a second mode, wherein the demodulation reference signal is non-precoded and the user data is precoded;
a third mode, wherein the user data is transmitted such that the transmission appears as single antenna transmission to a receiver and the demodulation reference signal is non-precoded; and
a fourth mode, wherein the user data is non-precoded and transmitted from at least two antenna elements with a transmission diversity method, and the demodulation reference signal is non-precoded.

12. The apparatus of claim 10, wherein the first uplink transmission mode or the second uplink transmission mode is temporarily switched for a period of one subframe.

13. The apparatus of claim 10, further comprising:
utilizing at least one of the following:
control information indicating that the first uplink transmission mode or the second uplink transmission mode is to be switched and prescheduled information indicating when the first uplink transmission mode or the second uplink transmission mode is to be switched.

14. The apparatus of claim 10, wherein the processor is further configured to:
receive an indication of the condition of a channel between said user terminal and said network element;
determine that the uplink transmission mode is to be switched on the basis of the received indication; and
determine that control information on the to-be-applied uplink transmission mode is to be transmitted to said user terminal.

15. The apparatus of claim 10, wherein the processor is further configured to:
determine that a precoding codebook index is to be transmitted to the user terminal as the control information on the to-be-applied transmission mode, wherein at least one entry of the precoding codebook not used for indicating precoding coefficients is reserved for indicating an uplink transmission to be applied for a predetermined period.

16. The apparatus of claim 10, wherein the apparatus is comprised in a network element.

17. The apparatus of claim 10, wherein the processor is further configured to:
receive a precoding codebook index as control information on the to-be-applied transmission mode, wherein at least one entry of the precoding codebook not used for indicating precoding coefficients is reserved for indicating an uplink transmission mode to be applied for a predetermined period.

18. The apparatus of claim 11, wherein the processor is further configured to:
precode the user data on the basis of the most recently indicated precoding coefficients, or on the basis of a most recently indicated long-term entry of a precoding codebook.

19. The apparatus of claim 11, wherein processor is further configured to:
apply the non-precoded demodulation reference signal to uplink resources as in full-rank transmission.

20. The apparatus of claim 10, wherein the apparatus is comprised in a user terminal.

21. An apparatus comprising:
processing means for establishing a communication connection between a network element and a user terminal;
processing means for applying, over the communication connection, dynamic uplink transmission mode switching between a first uplink transmission mode and a second uplink transmission mode, wherein the first uplink transmission mode comprises a precoded demodulation reference signal in uplink transmission, and the second uplink transmission mode comprises a non-precoded demodulation reference signal in uplink transmission;
processing means for acquiring control information indicating the first uplink transmission mode or the second uplink transmission mode to be applied over the communication connection for a predetermined period, wherein the control information is determined by the network element; and
processing means for switching between the first uplink transmission mode and the second uplink transmission mode dynamically over the communication connection according to the control information.

22. An apparatus comprising:
at least one processor; and
at least one memory including a computer program code, wherein the at least one memory and the computer program code are configured, with the at least one processor, to cause the apparatus at least to:
establish a communication connection between a network element and a user terminal;
apply, over the communication connection, dynamic uplink transmission mode switching between a first uplink transmission mode and a second uplink transmission mode, wherein the first uplink transmission mode comprises a precoded demodulation reference signal in uplink transmission, and the second uplink transmission mode comprises a non-precoded demodulation reference signal in uplink transmission;
acquire control information indicating the first uplink transmission mode or the second uplink transmission mode to be applied over the communication connection for a predetermined period, wherein the control information is determined by the network element; and
switch between the first uplink transmission mode and the second uplink transmission mode dynamically over the communication connection according to the control information.

23. A computer program product comprising a non-transitory computer-readable storage medium bearing computer program code embodied therein for use with a computer, the computer program code comprising code for performing the method according to claim 1.

24. An apparatus comprising:
processing means for establishing a communication connection between a network element and a user terminal; and
processing means for applying dynamic uplink transmission mode switching between different uplink transmission modes over the communication connection,
wherein said apparatus is for switching an uplink transmission mode between at least two of the following modes over the communication connection:
a first mode, wherein the demodulation reference signal and user data are precoded;
a second mode, wherein the demodulation reference signal is non-precoded and the user data is precoded;
a third mode, wherein the user data is transmitted such that the transmission appears as single antenna transmission to a receiver and the demodulation reference signal is non-precoded; and
a fourth mode, wherein the user data is non-precoded and transmitted from at least two antenna elements with a transmission diversity method, and the demodulation reference signal is non-precoded.

25. An apparatus comprising:
at least one processor; and
at least one memory including a computer program code, wherein the at least one memory and the computer program code are configured, with the at least one processor, to cause the apparatus at least to:
establish a communication connection between a network element and a user terminal; and
apply dynamic uplink transmission mode switching between different uplink transmission modes over the communication connection,
wherein said apparatus is for switching an uplink transmission mode between at least two of the following modes over the communication connection:
a first mode, wherein the demodulation reference signal and user data are precoded;
a second mode, wherein the demodulation reference signal is non-precoded and the user data is precoded;
a third mode, wherein the user data is transmitted such that the transmission appears as single antenna transmission to a receiver and the demodulation reference signal is non-precoded; and
a fourth mode, wherein the user data is non-precoded and transmitted from at least two antenna elements with a transmission diversity method, and the demodulation reference signal is non-precoded.

26. A computer program product comprising a non-transitory computer-readable storage medium bearing computer program code embodied therein for use with a computer, the computer program code comprising code for performing the method according to claim 2.

* * * * *